United States Patent Office 3,381,030
Patented Apr. 30, 1968

3,381,030
ALIPHATIC CARBOXYLIC ACID ESTERS AND UNSATURATED CARBOXYLIC ACIDS BY OXIDATIVE CARBONYLATION OF OLEFINS
Giovanni Biale, Los Angeles, Donald M. Fenton, Anaheim, Kenneth L. Olivier, Placentia, and William D. Schaeffer, Pomona, Calif., assignors to Union Oil Company of California, Los Angeles, Calif., a corporation of California
No Drawing. Filed June 1, 1964, Ser. No. 371,751
14 Claims. (Cl. 260—497)

ABSTRACT OF THE DISCLOSURE

The process comprises the production of alpha,beta-ethylenically unsaturated carboxylic acids and/or beta-acyloxy carboxylic acids by the oxidative carbonylation of olefinic compounds. The olefin, oxygen and carbon monoxide are brought into contact with an anhydrous organic solvent containing 0.01–5 weight percent of a Group VIII noble meal, preferably palladium, at 30°–300° C. and a pressure sufficient to maintain the solvent in liquid phase. Preferred embodiments comprise the use of a redox agent which is a soluble nitrogen oxide salt and/or a soluble polyvalent transition metal having an oxidative potential greater than the Group VIII noble metal under the reaction conditions, e.g., cupric chloride. Preferably the reaction is initiated in the presence of an anhydride such as a carboxylic acid anhydride. When ethylene is reacted, acrylic and beta-acyloxypropionic acids are obtained.

DESCRIPTION OF THE INVENTION

This invention relates to the oxidative carbonylation of olefins to carboxylic acids and in particular to unsaturated carboxylic acids. In a specific embodiment, this invention relates to the oxidative carbonylation of ethylene to acrylic acid.

The unsaturated carboxylic acids such as acrylic acid are very attractive commercial commodities. The commercial preparation of the unsaturated acids and in particular acrylic acid, however, is quite complex and is based on relatively expensive raw materials. To illustrate, the raw materials presently employed for the preparation of acrylates or acrylic acid include acetylene, ethylene cyanohydrin, ketene and beta-propiolactone. The chemistry involved in the preparation of acrylic acid and acrylates from the aforementioned raw materials is quite complex and high yields of the acid are not readily obtained. As a result, only a few manufacturers produce these chemicals and these producers enjoy a relatively stable price structure free from intensive competition with other chemistry.

It is an object of this invention to provide a method for the oxidation of olefins to carboxylic acids.

It is an object of this invention to provide a direct oxidation to acrylic acid from ethylene.

It is a further object of this invention to provide a continuous oxidation for the preparation of carboxylic acids from olefins.

Other and related objects will be apparent from the following description.

We have now found that alpha,beta-unsaturated carboxylic and beta-acyloxycarboxylic acids can be directly prepared by an oxidative carbonylation reaction. Our process comprises contacting an olefin, carbon monoxide and oxygen with an organic solvent containing a platinum group metal and, optionally, a redox agent. When the reaction is performed in a non-reactive organic solvent, the alpha,beta-unsaturated carboxylic acids can be obtained directly. When the organic solvent comprises an aliphatic or aromatic carboxylic acid, beta-acyloxycarboxylic acids are also obtained. These products, which comprise carboxylic acid esters of beta-hydroxycarboxylic acids can readily be pyrolyzed by thermal and/or catalytic processing to provide complete conversion to the alpha,beta-unsaturated carboxylic acids.

It has been reported that carbonylation of olefins can be performed with organic solvents containing a platinum group metal salt. To illustrate, it has been reported that ethylene, when contacted with a benzene solution of palladium dichloride and carbon monoxide forms beta-chloropropionyl chloride. This reaction, however, results in a stoichiometric reduction of the palladous ion to palladium metal. Accordingly, this reaction has heretofore remained a laboratory curiosity useful for proving reaction mechanisms but not offering a commercially attractive synthesis of carboxylic acids.

We have found, however, that carboxylic acids can be directly obtained in a continuous fashion by the simultaneous contacting of an olefin, carbon monoxide and oxygen if the reaction is initiated and maintained under substantially anhydrous conditions. During the reaction, the platinum group metal is reduced from its highest valency state to a lower valency. The reduced metal is then oxidized to the higher valency by contacting of the liquid with oxygen. Preferably, a suitable redox agent is employed to facilitate the oxidation. The overall reaction is as follows:

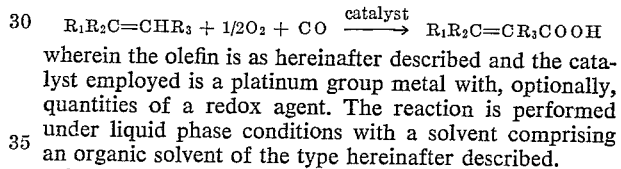

$$R_1R_2C=CHR_3 + 1/2 O_2 + CO \xrightarrow{\text{catalyst}} R_1R_2C=CR_3COOH$$

wherein the olefin is as hereinafter described and the catalyst employed is a platinum group metal with, optionally, quantities of a redox agent. The reaction is performed under liquid phase conditions with a solvent comprising an organic solvent of the type hereinafter described.

The reaction can be performed under relatively mild conditions and exhibits an attractive rate at temperatures from about 30° to about 300° C. and pressures sufficient to maintain liquid phase conditions. Preferably pressures between about atmospheric and about 200 atmospheres are employed, the higher pressures being favored to accelerate the reaction. To initiate the reaction under substantially anhydrous conditions, we prefer to introduce a suitable dehydrating agent into the reactants, e.g., to introduce an acid anhydride such as acetic anhydride, phthalic anhydride, etc., or an acyl halide such as acetyl chloride, etc., so as to insure that the reaction will favor the oxidative carbonylation. It is important that the reaction be initiated and maintained under anhydrous conditions, e.g., with reaction solvents containing less than about one weight percent of water to insure that the oxidative carbonylation will occur and that undesired reactions such as oxidation to carbon dioxide, aldehydes, ketones or unsaturated esters do not occur.

To initiate the reaction under anhydrous conditions, we prefer to add the salts, hereafter specified, in their anhydrous state. It is of course apparent that when hydrated salts are employed, an anhydrous reaction medium can be achieved by elimination of the water, e.g., by volatilization of the water by heating, stripping or distilling. The distillation can be facilitated in accordance with the skill of the art by use of a suitable water-azeotroping agent such as alkyl esters, e.g., vinyl acetate, ethyl acetate, propyl propionate, etc.

Spurious side reactions such as might form a carbonyl or unsaturated ester from the olefin, e.g., acetaldehyde or vinyl acetate from ethylene, acetone from propylene, methyl ethyl ketone from butene-1, etc., or that lead to the formation of carbon dioxide from carbon monoxide, as well as other side reactions can result in the formation of water. As previously mentioned, the reaction should be maintained under anhydrous conditions, i.e., preferably in the absence of even slight amounts of water. To insure that water is not generated in sufficient amounts to preclude the desired oxidative carbonylation, the water can be eliminated by continuously stripping it from the reaction mixture by circulating a large gas volume through the liquid. This can be accomplished when oxidizing ethylene by recycling ethylene in excess, e.g., in an amount of excess ethylene to reactant ethylene from about 2:1 to about 25:1, cooling the effluent gas to condense water and other condensibles which are separated from the gas and returning the excess gaseous ethylene to the reactor. When olefins which are liquid under the reaction conditions are oxidized, any minor traces of water formed by spurious side reactions can be stripped out of the reactor with an inert gas purge in volume ratios comparable to those described in regard to the ethylene case. Any inert gas, e.g., carbon dioxide, nitrogen, argon, helium, methane, ethane, propane, etc., can be used to strip the water from the reactor.

Preferably, the slight amounts of water are eliminated from the system by addition of a suitable dehydrating agent thereto. Substantial quantities of the dehydrating agent are not necessary because water is not formed in the desired oxidative carbonylation reaction, but rather is generated only by the undesired and minor side reactions previously mentioned. Accordingly, we prefer to maintain anhydrous conditions by the addition of from about 0.1 to about 50, preferably from 2 to about 20, and most preferably from 5 to about 15 weight percent of an organic dehydrating agent. In general, any organic compound which itself is insert to the oxidative carbonylation and which reacts with water to form under the oxidation conditions a product which does not inhibit the production of the desired acids can be used. For ease of handling, such an agent preferably has from 2 to about 25 carbons. Examples of suitable compounds are: acid anhydrides of alkane and benzene carboxylic acids, e.g., acetic, propionic, butyric, valeric, caproic, caprylic, capric anhydride, etc., phthalic anhydride, benzoic anhydride, etc.; acyl halides, preferably chlorides, of alkanoic and benzene carboxylic acids such as acetyl chloride, propionyl bromide, valeryl fluoride, caproyl chloride, benzoyl chloride, toluyl chloride, etc.; alkyl and aryl isocyanates such as methyl isocyanate, benzene isocyanate, toluidine diisocyanate, amyl isocyanate, isooctyl isocyanate, etc.; N,N'-alkyl and aryl substituted carbodiimides such as N,N'-dimethyl carbodiimide, N,N'-diethylcarbodiimide, N,N'-diisopropyl carbodiimide, N,N'-dibutyl carbodiimide, N-amyl, N'-methyl carbodiimide, N,N'-dicyclohexyl carbodiimide, N,N'-diphenyl carbodiimide, N,N'-dibenzyl carbodiimide, etc.; ketene and alkyl ketenes or their dimers can also be employed such as ketene, methyl ketene, dimethyl ketene, ethyl ketene, propyl ketene, etc.

Preferably, the dehydrating agent is judiciously selected so that the product of its reaction with water is the same as the reaction solvent. Thus, when acetic acid is the reaction solvent, ketene, an acetyl halide and acetic anhydride are the best chosen dehydrating agent; with propionic acid, either methyl ketene, a propionyl halide or propionic acid, are best; etc.

The olefin oxidized in accordance with the invention can, in general, comprise any olefinic compound having from about 2 to about 25 carbons. The olefin should have at least one hydrogen bonded to at least one of the olefinic carbons and thus should be one of the following:

(1) Ethylene and substituted ethylenes such as

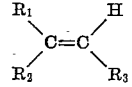

wherein $R_1$, $R_2$ and $R_3$ are hydrogen, alkyl, cycloalkyl, aryl, alkaryl, aralkyl, alkenylalkyl, alkenylaryl, halo, haloalkyl, haloaryl, carboxyl, carboxy alkyl, carboxyl aryl, acyloxy or nitroaryl;

(2) Cycloalkenes and substituted cycloalkenes such as

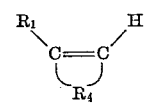

wherein $R_1$ is as previously mentioned and $R_4$ is an alkylene group or isoalkylene group having from 2 to about 6 carbons; or (3) Alkylene cycloalkanes such as

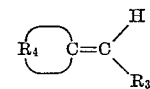

wherein $R_3$ and $R_4$ are as previously mentioned.

Examples of useful olefins are the aliphatic hydrocarbon olefins such as ethylene, propylene, butene-1, butene-2, pentene-2, 2-methylbutene-1, hexene-1, octene-3, 2-propylhexene-1, decene-2, 4,4'-dimethylnonene-1, dodecene-1, 6-propyldecene-1, tetradecene-5, 7-amyldecene-3, hexadecene-1, 4-ethyltridecene-2, octadecene-1, 5,5-dipropyldodecene-3, eicosene-7, etc. Of these the aliphatic hydrocarbon olefins having from 2 to about 6 carbons are preferred.

Other olefins include: vinylcyclohexane, allylcyclohexane, styrene, p-methyl styrene, α-methylstyrene, β-methylstyrene, p-vinylcumene, α-vinylnaphthalene, 1,2-diphenylethylene, allylbenzene, 6-phenylhexene-1, 1,3-diphenylbutene-1, 3-benzylheptene-3, o-vinyl p-xylene, α-chlorostyrene, p-chlorostyrene, m-nitrostyrene, divinylbenzene, 1-allyl,4-vinylbenzene, 1,5-heptadiene, 2,5-decadiene, vinyl chloride, vinylidene dichloride, vinyl fluoride, trichloroethylene, trifluoroethylene, di(chloromethyl) ethylene, propenyl chloride, acrylic acid, crotonic acid, maleic acid, p-vinylbenzoic acid, p-allylphenylacetic acid, vinyl acetate, vinyl propionate, propenyl acetate, butenyl caproate, ethylidene diacetate, etc.

Cycloalkenes, their substituted derivatives and alkylene cycloalkanes include: cyclobutene, cyclopentene, cyclohexene, methylcyclohexene, amylcyclopentene, cycloheptene, cyclooctene, cyclodecene, methylenecyclohexane, ethylidene cyclohexane, propylidene cyclohexane, etc.

As previously mentioned, the reaction is performed under liquid phase conditions in the presence of a liquid organic solvent which has a solvency for the catalyst and which, preferably, is inert to the reaction conditions. Various organic liquids can be employed for this purpose such as sulfoxides, sulfones, amides, acetyl chlorides, ketones, ethers and esters. Also, carboxylic acids such as the lower molecular weight fatty acids or benzene carboxylic acids can also be employed as a solvent.

Illustrative of this last class of solvents are formic, acetic, propionic, butyric, pentanoic, hexanoic, heptanoic, octanoic acids, benzoic, toluic, phthalic acids, etc. Of these, the fatty carboxylic acids having from about 2 to about 8 carbons are preferred. The carboxylic acids are not entirely inert under the oxidation conditions in that the carboxylic acids add to the olefin double bond to form beta-acyloxy compounds. These materials, however, can be readily pyrolyzed to recover both the carboxylic acid for reuse as the reaction medium and the desired unsaturated acid.

Other organic solvents that can be employed include the alkyl and aryl sulfoxides and sulfones such as dimethylsulfoxide, propylethylsulfoxide, diisopropylsulfone, decylmethylsulfoxide, butylamylsulfone, diisooctylsulfoxide, diphenylsulfoxide, methylbenzylsulfone, etc.

Another class of organic solvents that have sufficient solvency for the catalyst salts and that are inert to the oxidative carbonylation are various amides such as formamide, dimethyl formamide, ethylisopropyl formamide, acetamide, n - phenylacetamide, N,N - dipropylacetamide, iso-butyramide, N-ethylisobutyramide, isovaleric amide, N,N-dimethylisovaleric amide, isocaprylic amide, N,N- methyl-n-caprylic amide, N-propyl-n-heptanoic amide, iso-undecyclic amide, etc.

Various alkyl and aryl ketones can also be employed as the reaction solvent, e.g., acetone methylethyl ketone, diethyl ketone, diisopropyl ketone, ethyl-n-butyl ketone, methyl-n-amyl ketone, cyclohexanone, di-iso-butyl ketone, etc.

Ethers can also be employed as the reaction solvent, e.g., di-iso-propyl ether, di-n-butyl ether, ethylene glycol di-iso-butyl ether, methyl o-tolyl ether, ethylene glycol di-butyl ether, di-iso-amyl ether, methyl p-tolyl ether, methyl m-tolyl ether, dichloroethyl ether, ethylene glycol di-iso-amyl ether, diethylene glycol diethyl ether, ethylbenzyl ether, diethylene glycol di-ethyl ether, diethylene glycol dimethyl ether, ethylene glycol dibutyl ether, ethylene glycol diphenyl ether, triethylene glycol diethyl ether, diethylene glycol di-n-hexyl ether, tetraethylene glycol dimethyl ether, tetraethylene glycol dibutyl ether, etc.

Various esters can also be employed as the solvent, e.g., ethyl formate, methyl acetate, ethyl acetate, n-propyl formate, iso-propyl acetate, ethyl propionate, n-propyl acetate, sec-butyl acetate, iso-butyl acetate, ethyl n-butyrate, n-butyl acetate, iso-amyl acetate, n-amyl acetate, ethyl formate, ethylene glycol diacetate, glycol diformate, cyclohexyl acetate, furfuryl acetate, iso-amyl n-butyrate, diethyl oxalate, isoamyl iso-valerate, methyl benzoate, diethyl malonate, valerolactone, ethyl benzoate, methyl salicylate, n-propyl benzoate, n-dibutyl oxalate, n-butyl benzoate, diiso-amyl phthalate, dimethyl phthalate, diethyl phthalate, benzyl benzoate, n-dibutyl phthalate, etc.

As previously mentioned, the reaction medium should contain catalytic amounts of a platinum group metal. The platinum group metal can be of the palladium sub-group or the platinum sub-group, i.e., palladium, rhodium, or ruthenium or platinum, osmium, rhenium or iridium. While all of these metals are active for the reaction, we prefer palladium because of its demonstrated greater activity. The platinum group metal can be employed in amounts between about 0.001 and about 5 weight percent of the liquid reaction medium; preferably between about 0.04 and about 2.0 weight percent. The platinum group metal can be added to the reaction medium as a finely divided metal, as a soluble salt or as a chelate. Preferably, the metal in its most oxidized form, i.e., as a soluble salt or chelate is introduced into the reaction zone to avoid the formation of undesired quantities of water. Examples of suitable salts are the halides and carboxylates of the metals such as palladium chloride, rhodium acetate, ruthenium bromide, osmium propionate, iridium benzoate, palladium isobutyrate, etc. Examples of suitable chelates are palladium acetylacetonate, and complexes of the platinum group metal ions with such conventional chelating agents as ethylene diamine tetraacetic acid, citric acid, etc.

To facilitate the rate of oxidation by rendering it more facile to oxidize the reduced form of the platinum metal, we prefer to employ a reaction medium that contains a halogen, i.e., a bromine or chlorine (preferably a chlorine) containing compound. The halogen can be added as elemental chlorine or bromine; however, it is preferred to employ less volatile halogen compounds such as hydrogen, alkali metal or ammonium halide, e.g., hydrogen chloride; hydrogen bromide, cesium chloride, potassium bromide, sodium bromate, lithium chlorate; ammonium bromide, ammonium chloride, etc. Also, any of the aforementioned platinum group metals can be added to supply a portion of the bromide or chloride and, when the hereafter mentioned multivalent metal redox salts are employed, these too can be added as the chloride or bromide. Various organic compounds which liberate chlorine, bromine, hydrogen chloride or bromide under the reaction conditions can also be used, such as aliphatic chlorides or bromides, e.g., ethyl bromide, propyl chloride, butyl chloride, benzyl bromide, phosgene, etc. A particularly attractive source of halide comprises the acyl halides which, as previously mentioned, also serve as organic dehydrating agents. Thus, the use of acetyl chloride serves to remove any undesired water and also provides a continuous source of hydrogen chloride, thereby replacing any chloride lost during the reaction by vaporization or side reactions.

In general, sufficient amount of any of the aforementioned halogen containing compounds can be added to provide between about 0.05 and about 5.0 weight percent free or coordinately bonded or covalently bonded halogen in the reaction zone; preferably concentrations between about 0.1 and about 3.0 weight percent are employed. This amount of halogen is preferably also in excess of the stoichiometric quantity necessary to form the halide of the most oxidized state of platinum group metal, e.g., in excess of two atomic weights of halogen per atomic weight of palladium present. In this manner, a rapid oxidation can be achieved.

As previously mentioned, various redox compounds can optionally be used in the reaction medium to accelerate the rate of reaction. In general, any multivalent metal salt having an oxidation potential higher, i.e., more positive than the platinum metal in the solution, can be used. Typical of such are the soluble salts of the multivalent metal ions such as the carboxylates, e.g., propionates, benzoates, acetates, etc.; nitrates, sulfates; halides, e.g., bromides, chlorides, etc.; of copper, iron, manganese, cobalt, mercury, nickel, cerium, uranium, bismuth, tantalum, chromium, molybdenum, or vanadium. Of these, cupric and ferric salts are preferred and cupric salts are most preferred. In general the multivalent metal ion salt is added to the reaction medium to provide a concentration of the metal therein between about 0.1 and about 10 weight percent; preferably between about 0.5 and about 3.0 weight percent.

Various other oxidizing agents can also be employed to accelerate the rate of reaction. Included in such agents are the nitrogen oxides that function as redox agents similar to those previously described. These nitrogen oxides can be employed as the only redox agent in the reaction medium or they can be employed jointly with one or more of the aforedescribed redox metal salts such as a combination of a nitrogen oxide and a cupric redox agent or ferric redox agent. In general, between about 0.01 and about 3 weight percent of the reaction medium; preferably between about 0.1 and about 1 weight percent; calculated as nitrogen dioxide can comprise a nitrogen oxide that is added as a nitrate or nitrite salt or nitrogen oxide vapors. The nitrogen oxides can be added to the reaction medium in various forms, e.g., nitrogen oxide vapors such as nitric oxide, nitrogen dioxide, nitrogen tetraoxide, etc. can be introduced into contact with the reaction medium during the oxidation to fix the aforementioned nitrogen oxide content therein or soluble nitrate or nitrite salts such as sodium nitrate, lithium nitrate, lithium nitrite, potassium nitrate, cesium nitrate, etc. can be added to the reaction medium.

The process is operated continuously wherein the platinum group metal and redox agent participate in a catalytic manner. In this method, oxygen is introduced together with the olefin and carbon monoxide into contact with the liquid reaction medium. The carbonylation of the olefin and oxidation to the carboxylic acid results in the stoichiometric reduction of the platinum group metal. The introduction of oxygen serves to reoxidize the reduced metal to its more oxidized and active form. This oxidation is known to form a stoichiometric quantity of water. Surprisingly, however, we discovered that so long as we exercised care in initiating the reaction under anhydrous conditions, the water so formed did not promote the more expected but less desired reactions, i.e., formation of an aldehyde or ketone from the olefin or oxidation of carbon monoxide to carbon dioxide, but rather, the water so formed was consumed in formation of the desired acid product so that no accumulation of water resulted during the continuous reaction. Accordingly, in accordance with our discovery, the reaction can be maintained under anhydrous conditions and a continuous preparation of alpha, beta-unsaturated or beta-acyloxycarboxylic acids is achieved without need to continuously add a dehydrating agent or to strip the water from the reaction zone.

The oxygen is introduced into contact with the liquid reaction medium at a rate controlled in response to the oxygen content of the exit gases from the reaction zone. Continuous or intermittent introduction of oxygen can be employed; however, continuous introduction is preferred. Preferably, the rate of oxygen introduction is controlled relative to the olefin and carbon monoxide rates so as to maintain the oxygen content of the exit gases below the explosive concentration, i.e., less than about 10 and preferably less than about 3 volume percent. Under these conditions, the excess gas comprising chiefly the olefin and carbon monoxide can be recycled to the liquid reaction medium. When the olefin is a liquid under the reaction conditions, an inert gas such as nitrogen, air or mixtures of nitrogen and air can be employed to dilute the gas phase and exit gas stream from the reactor and thereby avoid explosive gas compositions.

The carbon monoxide is introduced into contact with the reactants at a sufficient rate to insure that the desired carbonylation occurs. Relative rates of the carbon monoxide based on the olefin can be from 1:10 to 10:1 molecular units per molecular unit of olefin, preferably rates from about 1:1 to about 5:1 and most preferably from 1:1 to 2:1 molecular ratios are employed.

The reaction can be performed under relatively mild conditions, e.g., temperatures from about 30° to about 300° C.; preferably from about 90° to about 200° C. are employed. The reaction pressure employed is sufficient to maintain a liquid phase and preferably, when gaseous olefins are employed, superatmospheric pressures are used to increase the solubility of the olefin in the reaction medium and thereby accelerate the reaction rate. Accordingly, pressures from about atmospheric to about 200 atmospheres or more, preferably elevated pressures from about 10 to about 100 atmospheres are used.

During the oxidation, a portion of the liquid reaction medium can be continuously withdrawn and distilled to recover the desired products from the reaction medium which contains the catalyst salts and which is recycled for further contact to the reaction zone. Preferably, care is exercised to remove any quantities of water from this recycle reaction. The removal of the water from this recycle stream can be facilitated by azeotropic distillation, e.g., by the addition of a suitable water azeotrope forming agent to remove all water in the distillation and/or by the addition of any of the aforementioned organic dehydrating agents to the reaction medium, e.g., acetic anhydride, phthalic anhydride, acetyl chloride, etc., to the recycle stream.

The following examples will illustrate the practice of our invention and serve to demonstrate the results obtainable thereby:

EXAMPLE 1

Into a half-gallon autoclave was placed 1 gram palladium chloride, 10 grams anhydrous cupric chloride, 100 grams acetic anhydride, 400 grams acetic acid and 153 grams propylene. The autoclave was pressured with carbon monoxide to 500 p.s.i.g. and then heated to 300° F. While maintaining this temperature, and stirring, oxygen was slowly introduced into contact with the reactants at 20 p.s.i. increments to maintain a relatively constant pressure. After thirty minutes, the introduction of oxygen was ceased and the autoclave cooled, depressured and opened. The liquid contents were removed and distilled to recover, as the major product, a 40 gram fraction boiling at 80°–85° C. at 2–3 millimeters Hg pressure. This compound, which solidified on standing, was dissolved in aqueous methanol and crotonic acid, having a melting point of 72° C., was recrystallized therefrom. The equivalent weight of the solid determined by base neutralization was 87.2 grams per equivalent of base, indicating a high degree of purity of the product.

The experiment was repeated with a reaction medium comprising 480 grams acetic acid and 20 grams acetic anhydride and the major product obtained was 75 grams beta-acetoxybutyric acid.

EXAMPLE 2

Into a half-gallon autoclave was placed 1 gram palladium chloride, 10 grams anhydrous cupric chloride, 400 grams acetic acid and 100 grams acetic anhydride. The autoclave was pressured to 300 p.s.i.g. with ethylene, then to 600 p.s.i.g. with carbon monoxide and thereafter heated to 300° F. Oxygen was introduced at twenty p.s.i. increments over a thirty minute period. After thirty minutes, the autoclave was cooled, depressured and opened. The solution was distilled to recover 45 grams of product boiling at 119° C. at 2.5 millimeters Hg pressure. This product had a neutralization equivalent of 131.2 grams per equivalent and a density at 22° C. of 1.4315, corresponding quite closely to those of beta-acetoxypropionic acid. A sample of this acid was passed into contact with glass beads at 300° C. in a glass tube. The product was collected in an ice water trap and inspected by gas chromatographic analysis to find the entire product to be an equimolar mixture of acetic and acrylic acids.

EXAMPLE 3

A half-gallon autoclave was charged with 1.0 gram palladium chloride, 5 grams lithium chloride, 5 grams anhydrous cupric chloride, 500 grams acetic acid and 50 grams acetic anhydride. The autoclave was pressured with 300 p.s.i. of ethylene, then with an additional 600 p.s.i. of carbon monoxide, and thereafter heated to 300° F. While maintaining this temperature and stirring, oxygen was introduced in 10–20 p.s.i.g. increments over a twenty minute period. Then the autoclave was cooled, depressured into a gas received and opened. The liquid product was distilled and analyzed by gas chromatography to find about 78 grams of a mixture of acrylic and beta-acetyl-oxypropionic acid corresponding to a yield of acrylic acid of 66.6 grams. The collected gases from the autoclave were analyzed and found to contain only 1.67 mol percent of carbon dioxide, indicating a high efficiency of the oxidation.

The example was repeated, but in lieu of palladium chloride, 1 gram of chloroplatinic acid and 1 gram of rhodium chloride were substituted therefore in two separate experiments. Substantially the same results were obtained.

The example was also repeated, except 5 grams of 70 percent nitric acid were used in lieu of the cupric chloride. The reaction rate was slower than observed when using cupric chloride, but a continuous reaction nevertheless occurred.

When the experiment was repated but without precaution to provide and maintain an anhydrous reaction medium, about 40 grams of acetaldehyde were obtained as the major liquid product.

EXAMPLE 4

Example 3 was repeated with the same amounts of salts but with a reaction medium comprising 20 parts acetic anhydride and 400 parts acetic acid. The autoclave was heated to 100° C. and pressured to 400 p.s.i.g. with ethylene, then to 800 p.s.i.g. with carbon monoxide. Oxygen was added in ten 20 p.s.i. increments over a one hour period while stirring and maintaining the temperature at 100° C. The final pressure at 100° C. was 550 p.s.i.g. The autoclave was then cooled, depressured and opened. The liquid contents were distilled to recover 49 grams beta-acetoxypropionic acid, boiling at 106°–107° C. under 1 millimeter Hg pressure with a refractive index at 28° C. of 1.4293 and 8 grams of acrylic acid.

The Example 3 was repeated with the same amounts of salts but with a reaction medium comprising 50 grams acetic anhydride and 400 grams dimethyl formamide. The autoclave was pressured as in Example 4 and then heated to 120° C. The initial pressure was 910 p.s.i.g. and, after ten oxygen additions of 20 p.s.i. increments each over a one hour period, the final pressure was 860 p.s.i.g. Beta-acetoxypropionic acid was recovered as a product.

The example was similarly repeated with use of 400 grams ethyl acetate in lieu of the dimethyl formamide with substantially the same results.

The preceding examples have been set forth to illustrate a mode of practice of the invention and to demonstrate the results thereby obtainable. It is not intended that these examples be unduly limiting of the invention which, rather, is intended to be defined by the method steps, reactants, solvents and reaction conditions and all apparent equivalents of the aforementioned set forth in the following claims:

We claim:
1. The oxidative carbonylation of an olefin having from about 2 to 25 carbons and having a structure corresponding to:

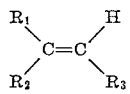

wherein $R_1$, $R_2$ and $R_3$ are selected from the class consisting of hydrogen, alkyl, cycloalkyl, aryl, alkaryl, aralkyl, alkenylalkyl, alkenylaryl, halo, haloalkyl, haloaryl, carboxyl, carboxylalkyl, carboxylary, lower alkanoyloxy, nitroaryl and alkylene wherein two of said $R_1$, $R_2$ and $R_3$ groups comprise a common alkylene group;
said oxidative carbonylation comprising the steps of contacting an anhydrous organic reaction solvent containing a salt of a platinum group metal in the highest oxidation state of said platinum metal with said olefin, carbon monoxide and oxygen at a temperature from about 30° to 300° C. and at a pressure sufficient to maintain said reaction solvent in liquid phase, while maintaining said reaction solvent anhydrous to thereby oxidatively carbonylate said olefin by replacing the hydrogen of an olefinic carbon with a carboxyl group derived from said carbon monoxide.

2. The oxidative carbonylation of hydrocarbon olefins having from 2 to about 25 carbons that comprises contacting said olefin, oxygen and carbon monoxide with an anhydrous organic reaction solvent that contains from about 0.001 to 5.0 weight percent of a platinum group metal at a temperature between about 30° and 300° C. and sufficient pressure to maintain said solvent in liquid phase while removing water therefrom to maintain said solvent anhydrous to thereby obtain a beta-ethylenically unsaturated acid having a total of one more carbon than said olefin.

3. The oxidation of claim 2 wherein said platinum group metal is palladium.

4. The oxidation of claim 2 wherein said organic reaction solvent also contains between about 0.1 and 10 weight percent of a redox agent selected from the class consisting of soluble salts of multivalent metals having an oxidation potential more positive in said solvent than said platinum metal, nitrogen oxides and mixtures thereof.

5. The oxidation of claim 2 wherein said water is continuously removed by vaporization from said reaction zone.

6. The oxidation of claim 2 wherein said reaction solvent also contains from 1 to about 50 weight percent of an organic dehydrating agent having from about 2 to about 25 carbons and selected from the class consisting of acyl halides, alkanoic and benzene carboxylic acid anhydrides, ketene, alkylketenes, alkyl and benzene isocyanates, alkyl carbodiimides and mixtures thereof.

7. The oxidative carbonylation of claim 2 wherein said olefin is a hydrocarbon olefin having from 2 to about 6 carbons.

8. The oxidative carbonylation of claim 2 wherein said olefin is propylene and said carboxylic acid comprises crotonic acid.

9. The oxidative carbonylation of claim 7 wherein said reaction solvent comprises an aliphatic carboxylic acid having from about 1 to about 5 carbons and said acid product also comprises a beta-acyloxy carboxylic acid wherein said acyloxy group is derived from said carboxylic acid solvent.

10. The oxidative carbonylation of ethylene to acrylic acid which comprises introducing ethylene, oxygen and carbon monoxide into contact with an anhydrous organic reaction solvent that contains from 0.001 to about 5.0 weight percent of a platinum group metal at a temperature between about 30° and about 300° C. and sufficient pressure to maintain said organic reaction solvent under liquid phase conditions at said temperature while removing water from said solvent to maintain said solvent anhydrous and thereby obtain said acrylic acid.

11. The oxidative carbonylation of claim 10 wherein said reaction solvent also contains between about 0.1 and about 10 weight percent of a redox agent selected from the class consisting of soluble salts of multivalent metal ions having an oxidation potential more positive than said platinum group metal, nitrogen oxides and mixtures thereof.

12. The oxidative carbonylation of ethylene to acrylic and beta-acyloxypropionic acid that comprises contacting ethylene, oxygen and carbon monoxide with an anhydrous aliphatic acid solvent containing from about 0.1 to about 50 weight percent of the anhydride of said aliphatic acid, between about 0.001 and about 5.0 weight percent of palladium dichloride and between about 0.5 and about 3.0 weight percent of cupric chloride, at a temperature between about 30° and 300° C. and sufficient pressure to maintain said aliphatic acid in liquid phase.

13. The oxidation of claim 12 wherein said aliphatic acid is acetic and said anhydride is ketene.

14. The oxidation of claim 12 wherein said anhydride is acetic anhydride, and said aliphatic acid is acetic acid.

References Cited

UNITED STATES PATENTS

| 3,065,242 | 11/1962 | Alderson et al. | 260—544 X |
| 3,309,403 | 3/1967 | Mador | 260—544 |
| 3,338,961 | 8/1967 | Closson et al. | 260—544 |

FOREIGN PATENTS

| 969,018 | 9/1964 | Great Britain. |
| 614,970 | 3/1962 | Belgium. |

OTHER REFERENCES

Tsuji, et al., Tetrahedron Letters, No. 16, pp. 1061–1064, 1963.

LORRAINE A. WEINBERGER, *Primary Examiner.*

R. K. JACKSON, *Examiner.*

VIVIAN GARNER, S. WILLIAMS,
*Assistant Examiners.*